(12) United States Patent
Schulz et al.

(10) Patent No.: US 10,337,897 B2
(45) Date of Patent: Jul. 2, 2019

(54) ULTRASOUND FLOW RATE MEASUREMENT APPARATUS AND MANUFACTURING METHOD FOR SAME

(71) Applicant: SICK Engineering GmbH, Ottendorf-Okrilla (DE)

(72) Inventors: Christian Schulz, Ottendorf-Okrilla (DE); Jörg Schneider, Chemnitz (DE); Torsten Schmidt, Chemnitz (DE)

(73) Assignee: SICK ENGINEERING GMBH, Ottendorf-Okrilla (DE)

( * ) Notice: Subject to any disclaimer, the term of this patent is extended or adjusted under 35 U.S.C. 154(b) by 0 days.

(21) Appl. No.: 15/816,148

(22) Filed: Nov. 17, 2017

(65) Prior Publication Data

US 2018/0156651 A1   Jun. 7, 2018

(30) Foreign Application Priority Data

Dec. 7, 2016 (EP) .................................. 16202725

(51) Int. Cl.
*G01F 1/66* (2006.01)
*H04R 31/00* (2006.01)
(Continued)

(52) U.S. Cl.
CPC .............. *G01F 1/662* (2013.01); *B23B 35/00* (2013.01); *G01F 15/00* (2013.01); *G01F 15/18* (2013.01)

(58) Field of Classification Search
CPC .................................. G01F 1/66; H04R 31/00
See application file for complete search history.

(56) References Cited

U.S. PATENT DOCUMENTS 4,467,659 A    8/1984  Baumoel
5,090,252 A *  2/1992  Tschirner ............... G01F 1/662
                                              73/861.28
(Continued)

FOREIGN PATENT DOCUMENTS

DE        10249542 A1    5/2004
EP         1378727 B1    1/2004
(Continued)

OTHER PUBLICATIONS

European Search Report dated Jun. 26, 2017 in corresponding European Patent Application No. 16202725.4.
(Continued)

*Primary Examiner* — Jewel V Dowtin
(74) *Attorney, Agent, or Firm* — Nath, Goldberg & Meyer; Jerald L. Meyer; Stanley N. Protigal

(57) ABSTRACT

A method of manufacturing an ultrasound flow rate measurement apparatus is provided, wherein at least one pocket for an ultrasonic transducer is manufactured from the outside in a line wall of a line section in which a fluid flows in operation and an ultrasonic transducer is arranged in the pocket, wherein the ultrasonic transducer has an oscillating body that couples to a part region of the line wall and that acts as a membrane of the ultrasonic transducer capable of vibration. In this respect, a manufacturing step of the pocket has a drilling procedure and a coupling piece is manufactured with the pocket and is arranged between the membrane and the oscillating body after the insertion of the ultrasonic transducer and its cross-section is smaller than the cross-section of the oscillating body.

20 Claims, 6 Drawing Sheets

(51) Int. Cl.
*G01F 15/00* (2006.01)
*B23B 35/00* (2006.01)
*G01F 15/18* (2006.01)

(56) References Cited

U.S. PATENT DOCUMENTS

| | | | |
|---|---|---|---|
| 8,904,881 B2 * | 12/2014 | Sonnenberg | G01F 1/662 |
| | | | 73/861.27 |
| 2008/0034887 A1 * | 2/2008 | Rieder | G01F 1/662 |
| | | | 73/861.28 |
| 2015/0177036 A1 * | 6/2015 | Speidel | G01F 1/66 |
| | | | 73/861.27 |
| 2016/0153816 A1 * | 6/2016 | Hayashi | G01F 1/662 |
| | | | 73/861.29 |

FOREIGN PATENT DOCUMENTS

| | | | |
|---|---|---|---|
| EP | 3062114 A1 | 8/2016 | |
| EP | 3246668 A1 | 11/2017 | |
| JP | 200-337940 A | 12/2000 | |

OTHER PUBLICATIONS

Office Action dated Apr. 12, 2017 in corresponding European Patent Application 16202725.4.

\* cited by examiner

| Membrane | Planar | | | Structured | | |
|---|---|---|---|---|---|---|
| Coupling element \ Recess | Cylindrical | Conical | Stepped | Cylindrical | Conical | Stepped |
| Cylindrical | ⌐⌐ | ⌐⌐ | ⌐⌐ | ⌐⌐ | ⌐⌐ | ⌐⌐ |
| Stepped | ⌐⌐ | ⌐⌐ | ⌐⌐ | ⌐⌐ | ⌐⌐ | ⌐⌐ |
| Elliptical | ⌐⌐ | ⌐⌐ | ⌐⌐ | ⌐⌐ | ⌐⌐ | ⌐⌐ |
| Conical | ⌐⌐ | ⌐⌐ | ⌐⌐ | ⌐⌐ | ⌐⌐ | ⌐⌐ |

------ Pre-drilling

—·—·— Profile drilling (Pre-contour)

·········· Extruding (End contour)

------ Pre-drilling

·········· Extruding (End contour)

ULTRASOUND FLOW RATE MEASUREMENT APPARATUS AND MANUFACTURING METHOD FOR SAME

FIELD

The invention relates to a method of manufacturing an ultrasound flow rate measurement apparatus, in which at least one pocket for an ultrasonic transducer is manufactured from the outside in a line wall of a line section in which a fluid flows in operation and an ultrasonic transducer is arranged in the pocket, wherein the ultrasonic transducer has an oscillating body that couples to a part region of the line wall and that acts as a membrane of the ultrasonic transducer capable of vibration and to an ultrasound flow rate measurement apparatus, in particular manufactured in accordance with the method presented herein, for determining the flow speed of a fluid flowing in a line using at least one ultrasonic transducer that is attached from the outside in a pocket of a line wall of the line and that has an oscillating body that couples to a part region of the line wall and that acts as a membrane of the ultrasonic transducer capable of vibration.

BACKGROUND

Different measurement principles are known for the determination of the flow speed or of the flow rate on an ultrasound basis. In a Doppler process, the frequency shift of an ultrasonic signal reflected at the flowing fluid that differs in dependence on the flow speed is evaluated. In a differential transit time process, a pair of ultrasonic transducers is mounted with a mutual offset in the longitudinal direction at the outer periphery of the conduit, said pair of ultrasonic transducers transmitting and registering ultrasonic signals alternatingly transversely to the flow along the measurement path spanned between the ultrasonic transducers. The ultrasound signals transported by the fluid are accelerated or decelerated by the flow depending on the running direction. The resulting transit time difference is calculated using geometrical parameters to form a mean flow speed of the fluid.

The volume flow or flow rate results from this with the cross-sectional area. For more exact measurements, a plurality of measurement paths each having a pair of ultrasonic transducers can also be provided to detect a flow cross-section at more than one point.

The ultrasonic transducers used to generate the ultrasound have an oscillating body, frequently a ceramic material. With its aid, an electric signal is, for example, converted into ultrasound, and vice versa, on the basis of the piezoelectric effect. Depending on the application, the ultrasonic transducer works as a sound source, as a sound detector or as both. In this respect, a coupling has to be provided between the fluid and the ultrasonic transducer.

A widespread solution comprises allowing the ultrasonic transducer to project into the line with a direct contact to the fluid. Such intrusive probes can make exact measurements more difficult due to a disturbance of the flow. Conversely, the dipping ultrasonic transducers are exposed to the fluid and to its pressure and temperature and are thereby possibly damaged or lose their function due to contamination and deposits.

Techniques are generally also known in which the inner wall remains completely closed. One example is the so-called clamp-in assembly, for instance in accordance with U.S. Pat. No. 4,467,659 by which ultrasonic transducers are fastened to the line from the outside. However, only diametrical measurement paths can thus be implemented through the pipe axis, whereby additional errors are generated with non-axially symmetrical flow profiles. In addition, the signal-to-noise ratio is reduced due to the solid pipe wall thickness the ultrasound signal has to penetrate and the measurement system thereby becomes more prone to disturbance.

JP 2000 337 940 A shows a further flow rate measurement apparatus in which the piezoelectric elements contact the line wall at the bottom of a bore in the line. However, a complicated multi-part design is required for this purpose and the probes can disturb the flow. The problems of a robust measurement, of a sufficiently broad radiation, and of a simple transducer design are consequently not solved.

It is proposed in DE 102 49 542 A1 to attach the ultrasonic transducer directly to a functional surface that is in contact with the medium. A path alignment having a component in the flow direction is achieved by chamfering the functional surfaces and thus of the line. A planar, unimpeded inner pipe wall is thereby precluded.

EP 1 378 727 B1 proposes attaching the ultrasound-generating elements to an outer side of a wall. Unlike the clamp-on technique, the ultrasonic transducer is in this respect so-to-say integrated into the wall. A pocket having a substantially smaller wall thickness than the remaining wall is formed in the region of the ultrasonic transducers and the remaining wall thickness forms the membrane of the ultrasonic transducer. This assembly, also known as clamp-in, is so-to-say an intermediate form of a fixed assembly in the inner space of the line and the clamp-on assembly. The transducer design is, however, relatively complicated and a broad, almost spherical radiation is at least not secured for higher frequencies with a small radiation surface.

In principle, an ultrasound flowmeter having a smooth inner pipe wall and having ultrasonic transducers integrated into the pipe wall would solve most of the previously described problems. To simultaneously achieve a simple design of the ultrasonic transducers and a sufficiently large radiation surface, a complex geometry of the pockets in the pipe wall in which the ultrasonic transducers are arranged is necessary.

However, this is preceded by the practical challenge of producing such a pocket with a high precision and simultaneously inexpensively. In principle, filigree structures could be produced by micro cutting, with micro cutters having a diameter of less than one millimeter being used in dependence on the structure sizes to be produced. For this purpose, however, high machining times are necessary and in addition the tools wear fast with materials that are difficult to cut. Other processes that can initially be considered are micro cutting in combination with microwelding, micro-EDM (electric discharge machining), micro-ECM (electrochemical machining) or laser ablation. These processes are, however, neither economic nor sufficiently precise.

A further production process known per se that has, however, not previously been associated with ultrasound measurement or even with the manufacture of transducer pockets in the prior art is profile drilling. This is drilling using a profile die to generate rotationally symmetrical inner surfaces that are determined by the main cutting edge profile of the tool. Tools from a diameter of more than 3 mm onward are primarily used to produce profile bores. Profile drilling would be superfluous for the simple geometry of a transducer pocket as in EP 1 378 727 B1.

DIN 8589 allocates profile drilling to the cutting processes in the subgroup of drilling/countersinking/reaming that in turn belongs to the group of cutting using a geometrically specified cutting edge. Subvariants of profile drilling include:

Profile drilling into solid material. Drilling into the solid material to produce the rotationally symmetrical profiled bores determined by the main cutting edge profile of the drilling tool.

Profile reboring. Reboring an already existing or pre-worked hole to generate the rotationally symmetrical inner surface determined by the main cutting edge profile of the drilling tool.

Profile countersinking. A drilling process carried out using a profile countersinking tool for generating rotationally symmetrical, profiled countersinks determined by the main cutting edge profile of the drilling tool.

Profile reaming. Profile reboring with a small cutting thickness by a reaming tool for generating dimensionally accurate and true-to-shape, profiled inner surfaces of high surface quality.

Against this background, it is the object of the invention to improve the arrangement of ultrasonic transducers in an ultrasound flow rate measurement apparatus.

SUMMARY

This object is satisfied by a method of manufacturing an ultrasound flow rate measurement apparatus. The basis is the clamp-in principle explained in the introduction. At least one pocket is formed from the outside in a line wall of a line section for this purpose. The line section is typically used as part of a line in which the fluid flows in operation whose flow rate is to be measured so that the cross-section of the line section preferably corresponds to this line. An ultrasonic transducer is inserted into the pocket and its oscillating body couples to a part region of the line wall. The oscillating body, for example a piezoceramic material, therefore uses the part region as a membrane.

The invention then starts from the basic idea of using a drilling process for a blind bore as a manufacturing step for the pocket. A coupling piece is manufactured simultaneously with the pocket, preferably as a part of the line wall, and remains in place on the formation of the pocket. The coupling piece is arranged between the membrane and the oscillating body after the insertion of the ultrasonic transducer and is preferably thinner than the oscillating body, substantially thinner in a realistic use. The oscillating body is therefore seated on the line wall like a kind of die with the coupling piece and the coupling piece transmits ultrasound between the membrane and the oscillating body. This can take place in both directions depending on whether the ultrasonic transducer acts as a transmitter or as a receiver. It is the dimensions of the coupling piece that limit the size of the radiation surface by this design and not those of the oscillating body. A small transducer plate or effective membrane and a large oscillating body are therefore simultaneously made possible. The pocket has the result that the part region of the line wall forming the membrane is substantially thinner than the remaining line wall. The coupling piece is small in cross-section both with respect to the oscillating body and to the bottom of the pocket.

The invention first has all the advantages of the clamp-in technique, namely a high measuring accuracy similar to an intrusive process, but with the inner space simultaneously remaining completely unimpeded for the flow. The pockets for the ultrasonic transducer are an integral component of the thin-walled carrier structure, that is of the line wall. The ultrasonic transducer thus integrated into the line wall enables a very broad radiation characteristic, non-diametrical measurement paths, and the detection of non-axially symmetrical flow profiles. The ultrasonic transducer has a simple design from a few parts in this respect and is suitable for mass production and can be manufactured inexpensively in small dimensions.

The manufacture in accordance with the invention satisfies the high demands on the manufacture of complex ultrasonic transducers integrated in a line wall. The manufacture makes short production times possible, is inexpensive, is suitable for mass production, and ensures the reproducibility of the machining with very tight shape and positional tolerances. The drilling procedure ensures the central arrangement of the elevated geometry, i.e. of the coupling piece, directed toward the borehole entry. In this respect, pockets having a complex geometry and quality can be manufactured with high precision while maintaining the still permitted deviations with small dimensions. The pocket can consequently also satisfy all the required properties for a good sound production and a good sound detection with respect to the geometry, in particular the coupling piece length and the coupling piece width or the coupling piece diameter, also with asymmetrical aspect ratios, with respect to the residual wall thickness of the membrane and the general pocket geometry, for example curved in a spherically single or double manner, but also with respect to the quality, in particular the planarity or roughness, of a still general structure on the coupling piece surface and pocket base surface. In addition, a good assembly capability and coupling of the oscillating body on the coupling piece should be ensured to transfer the shape change and thus the ultrasound.

The drilling procedure preferably comprises profile bores. The production process is used with a special profile drilling tool in this respect. The main cutting edge profile for the coarse pocket is supplemented by further and modified cutting edges to manufacture the exact geometry and the coupling piece.

A profile drilling tool is preferably used that has an inwardly disposed secondary cutting edge with which lateral surfaces of the coupling piece are manufactured. This is a possible modification of a conventional profile drilling tool with which the geometry of a part of the coupling piece is fixed and is manufactured with high quality.

A profile drilling tool is preferably used that has an inwardly disposed transverse cutting edge with which the height and contact surface of the coupling piece is manufactured. The height and the quality of the upper contact surface of the coupling surface for the oscillating body can be fixed by this modification of a conventional profile drilling tool.

The drilling process preferably has a pre-drilling. In contrast to profile drilling, pre-drilling means that only a blind hole for the pocket is manufactured. A special geometry at the base of the pocket or even the coupling piece is thus not yet created. This geometry is subsequently created by profile drilling, for example. The advantage is that the more complex tools, in particular a profile drilling tool, are less worn after the pre-drilling and actually only have to be prepared for the specific more complex geometry. The subsequent end production of the pocket is therefore substantially simplified by the pre-drilling.

An extrusion process preferably takes place after the drilling procedure to manufacture an end shape of the geometry of the pocket. Production steps are thus combined. The preceding drilling process can be a profile drilling. The extrusion or the indirect extrusion then serves to press the already present pocket into the end shape with at least pre-structures of the coupling piece by means of a profile die. If only a pre-drilling takes place beforehand, the profile die thus generates the special geometry of the pocket and the coupling piece in the extrusion process. The combination of three production steps of pre-drilling, profile drilling, and extrusion is also conceivable.

The coupling piece is preferably formed in one piece with the line wall. The base of the pocket preferably forms the membrane and the coupling piece is arranged on the base. The coupling piece is therefore an integral part of the line wall just like the membrane as a base of the pocket. There are no buffer layers, adhesive points or other contact points and thus no problems with the mechanical stability of the connection and an ideal sound transfer.

The coupling piece preferably has a diameter and/or a height of a few millimeters, in particular at most 2 mm. The line wall preferably has a residual wall thickness of at most 1 mm or even at most 0.8 mm or even less in the region of the membrane, that is at the base of the pocket. The pocket to be manufactured in accordance with the invention consequently has micro-dimensions. This is needed functionally so that the oscillating body can couple suitably or the membrane provides the desired acoustic coupling to the fluid. In particular small dimensions with a nevertheless very precise geometry are one reason why the manufacture of the pocket is so demanding. In the prior art, profile drilling typically serves for the manufacture of larger structures of 3 mm and more. A specially adapted profile drilling tool having inwardly disposed secondary cutting edges and transverse cutting edges as described above is therefore preferably used in accordance with the invention.

The coupling piece preferably has a cylindrical, conical or stepped geometry. The coupling piece can overall have the shape of a cylinder or of a truncated cone, but can also have a mixture of both. The base surface is typically rotationally symmetrical, that is a circle. An asymmetrical base surface as with an ellipse or even a base surface having corners are not fully precluded, but are as a rule less suitable from an acoustic aspect and in a technical production aspect. In addition, steps are conceivable, that is an abrupt change of the diameter in one or more height layers of the pocket. A continuous change of the diameter that, unlike with a cone, is non-linear would also be possible. The geometries are preferably manufactured by an especially adapted profile drilling tool or a pressing die.

Deviations from the rotational symmetry can be achieved, for example, as a concluding step by extrusion.

The line wall surrounding the coupling piece is preferably planar or structured. This region is the base of the pocket around the coupling piece that forms the membrane. This region can be smooth or have a desired structure depending on the acoustic demands. This is preferably anyway exactly predefined by the manufacture of the pocket.

The pocket overall preferably has a cylindrical, conical, elliptical or stepped geometry. The shape of the pocket apart from the coupling piece is meant by this. The geometric embodiments and the possibilities of achieving it correspond to those of the coupling piece. In addition, an elliptical geometry is named here as an example of a continuous change of the diameter of the cross-sectional surface that would also be possible for the coupling piece in another respect. Other regions of the tools are affected for the manufacture of the geometry than for that of the coupling piece, for instance outwardly disposed instead of inwardly disposed cutting edges of a profile drilling tool.

The pocket is preferably closed toward the outside by a transducer holder. The transducer holder is consequently a kind of cover of the ultrasonic transducer region. Access through this cover, for example for connection lines or data lines, remains possible, however. The oscillating body is preferably elastically connected to the transducer holder. The oscillating body is thus held in a stable manner without restricting the oscillation movement. An elastomer layer can serve this purpose, for example.

The oscillating body can preferably oscillate in the longitudinal and transverse directions. The oscillating body therefore utilizes additional degrees of freedom that are available to it by the arrangement on the thin coupling piece. Because the oscillating movement is reminiscent of the shaking a pillow, the oscillating body is also called a pillow oscillator. A comparable oscillation is not possible at all with a conventional arrangement with a full-area connection of the lower side of the oscillating body to the line.

The oscillating body is preferably of parallelepiped or cylinder shape. As already explained, the dimensions of the oscillating body are not determined by the radiation surface due to the coupling via the coupling piece. The oscillating body is preferably not only a thin ceramic material, but rather has an extent in a similar order of magnitude to its cross-sectional surface in the vertical direction. The oscillating body can also be built up of a plurality of individual layers.

The oscillating body is preferably at least partly arranged in the pocket. The oscillating body is even more preferably accommodated completely within the pocket. The coupling piece can thereby also remain comparatively short and the elements of the ultrasonic transducers are integrated in the line wall.

The fluid is preferably a liquid, with a gas also being possible. Flow speeds of gases are even typically measured using a clamp-in flowmeter. Ultrasonic frequencies are used with gases that also allow a realistic technical production implementation of the oscillating body and of a part region of the line wall acting as a membrane in a conventional design. The demands on the design are due to the fact that a wide radiation characteristic is only possible with radiation surfaces smaller than the wavelength. However, higher frequencies are required for liquids. A radiation surface of less than 4 mm with a residual wall thickness and gaps below 500 μm would then have to be reached. This problem is solved in accordance with the invention by the coupling piece and by the cancellation achieved therewith of the dependency of the dimensions of the oscillating body and the radiation surface or the special oscillation on the coupling piece.

The object is additionally satisfied by an ultrasound measurement apparatus. This ultrasound measurement apparatus can in particular be manufactured using an embodiment of the manufacturing method in accordance with the invention and show similar advantages in so doing. Such advantageous features are described in an exemplary, but not exclusive manner in the subordinate claims dependent on the independent claims.

The ultrasound flow rate measurement apparatus advantageously has at least two pockets each having an ultrasonic transducer that are disposed opposite one another with the flow therebetween and an offset in the direction of flow and it has an evaluation unit that is configured to exchange ultrasound signals between the ultrasonic transducers and to determine the flow speed with respect to a time of flight difference of ultrasound transmitted and received again with and against the flow. The ultrasound flow rate measurement apparatus consequently works according to the differential transit time process. Only one ultrasound path is initially spanned by two pockets and two ultrasonic transducers. Further ultrasound paths are also conceivable by additional ultrasonic transducers to detect an inhomogeneous or disturbed flow more precisely. The further ultrasound paths are also preferably implemented by ultrasonic transducers in pockets with a coupling piece as described. The Doppler process is an example of an alternative measurement principle.

BRIEF DESCRIPTION OF THE DRAWINGS

The invention will be explained in more detail in the following also with respect to further features and advantages by way of example with reference to embodiments and to the enclosed drawing. The Figures of the drawing show in.

DETAILED DESCRIPTION

Figure 1:
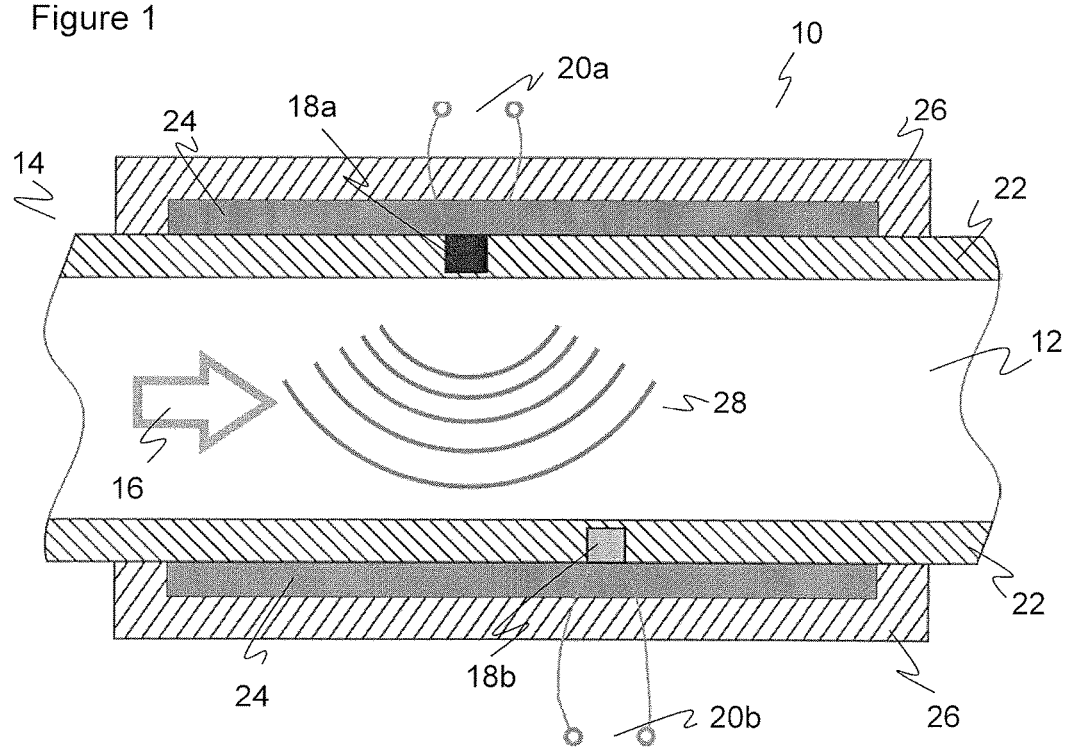
FIG. 1 a longitudinal sectional view of a measurement apparatus for determining the flow speed with ultrasound converters.

FIG. 1 shows a simplified longitudinal sectional view of a measurement apparatus 10 for determining the flow speed or the flow rate calculated therefrom of a fluid 12 in a tubular line 14 that flows in a direction marked by an arrow 16. The determination of the flow speed takes place, for example, using the differential time of flight method described in the introduction by evaluating the times of flight on a transmission and detection of ultrasonic signals between a pair of ultrasonic transducers 18a-b with and against the flow in an evaluation unit. The control and evaluation unit is not shown itself in FIG. 1, but is rather only indicated by its connections 20a-b to the ultrasonic transducers 18a-b. The number of ultrasonic transducers 18a-b can vary in other embodiments.

The line 14 in the region of the ultrasound measurement forms a measurement body of the measurement apparatus 10. The representation has been selected as if this measurement body were an integral part of the existing line 14. This is possible in principle, but in practice, the measurement apparatus 10 is manufactured with its own measurement body that replaces a corresponding section of an existing line after the assembly and is for this purpose, for example, inserted at both sides by flange connections.

The ultrasonic transducers 18a-b are integrated in a line wall 22 of the line 14. This first corresponds to the clamp-in assembly explained in the introduction such as in the patent EP 1 378 727 B1 named in the introduction, but with an improved transducer concept that will be explained in more detail below. The ultrasonic transducers 18a-b are supported from the outside by a transducer holder 24. In this exemplary embodiment, the line 14 or the transducer holder 24 is surrounded at the very outside in the region of the measurement body by a housing or by a cladding pipe 26.

As indicated by sound propagation lines 28, the outward and inward radiation directions of the ultrasonic transducers 18a-b are perpendicular to a center axis of the line 14. In order nevertheless to achieve an axial offset of the two ultrasonic transducers 18a-b and thus to achieve a measurement effect in a differential time of flight process, a broad radiation characteristic of, for example, more than 20° is required. At a higher ultrasonic frequency, in particular in the high kHz or even MHz range, this means a radiation surface whose diameter is only in the order of magnitude of a millimeter.

Instead of two ultrasonic transducers 18a-b, a plurality of pairs of ultrasonic transducers can also be provided that span a plurality of measurement paths between one another for a measurement apparatus 10 having a multi-path configuration. A more exact measurement is possible with an irregular flow or with upstream disturbances using such a multi-path counter that has a plurality of measurement paths offset with respect to one another and to the pipe axis. A single-path counter implicitly requires a homogeneous flow that can be detected by the single path or thereby only measures a first approximation of a more complicated flow.

Figure 2:
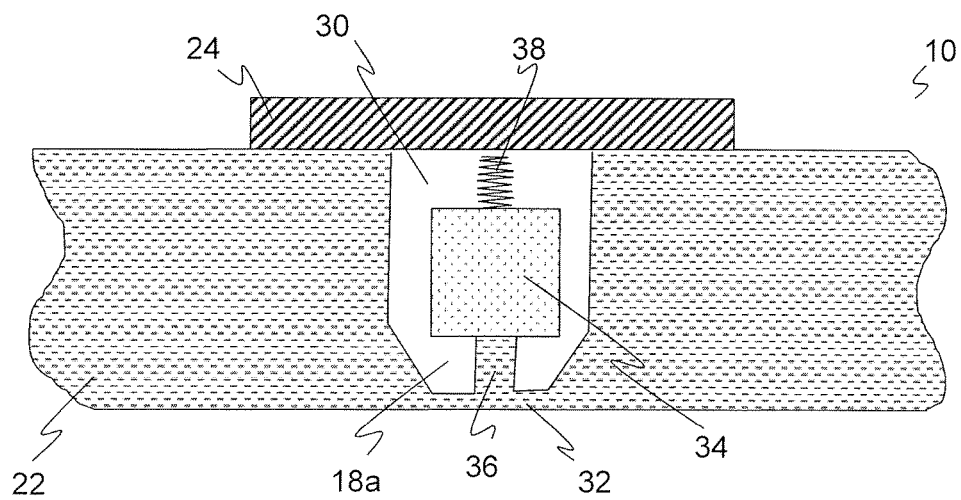
FIG. 2 a detailed view of an ultrasonic transducer region in FIG. 1.

FIG. 2 shows the region of an ultrasonic transducer 18a in the line wall 22 in an enlarged representation to illustrate the improvement and simplification by the transducer principle in accordance with the invention. A hollow space or a pocket 30 is formed in the line wall 22 and is closed toward the outside by the transducer holder 24. A thin-wall part region 32 of the line wall 22 remains toward the inside in the region of the pocket 30; it simultaneously serves as a membrane of the ultrasonic transducer 18a and is excited to oscillate by its oscillating body 34, for example a piezoceramic material, to transmit an ultrasonic signal; or conversely, it is excited to oscillate on an impact of an ultrasonic signal from the interior of the line 14 to the part region 32 of the oscillating body 34. The thin-walled part region 32 remains stable enough to withstand an internal line pressure to be expected. The line wall 22 forms an inner surface closed in itself without recesses or projections that could disturb the flow or at which deposits could settle.

The oscillating body 34 is now not directly placed onto the part region 32 acting as a membrane. A coupling element or coupling piece 36 is rather provided therebetween and its cross-sectional surface is much smaller than that of the part region 32 and of the oscillating body 34. The oscillating body 34 can be formed as a piezoelectric block that is placed directly onto the coupling piece 36. Both a direct connection between the oscillating body 34 and the coupling piece 36 and an additional coupling material are conceivable. In addition, the connection can only be established by a force-transmitting coupling, for instance by a clamping force from above, but also by adhesive bonding or soldering.

The coupling piece 36 is in turn preferably an integral element of the line wall 22 so that additional contact points are omitted. For this purpose, the pocket 30 and the coupling piece 36 are formed together in an efficient production process and the coupling piece 36 is-so-to-say left in position in so doing. The production in accordance with the invention will be explained in more detail later with reference to FIGS. 7 to 13. It should not be precluded, despite the foreseeable disadvantages in the sound transmission and in the mechanical robustness, to fasten the coupling piece 36 to the base of the pocket 30 at the part region 32 as a separate element. The oscillating body is held in a yielding manner at the transducer holder 24 toward the outside, which is represented by a spring 38. An exemplary practical implementation of the spring 38 is an elastomer layer. The force of the spring 38 can also establish or stabilize the connection between the oscillating body 34 and the coupling piece 36.

The coupling piece 36 makes possible a transducer plate or a radiation surface having a small diameter with a simultaneous utilization of a larger oscillating body 34. The possible dimensions of the oscillating body 34 and of the radiation surface become independent of one another due to the coupling piece 36. A larger oscillating body 34 is functionally advantageous both for the frequency configuration and for reaching the required sensitivity. As already addressed multiple times, a small radiation surface is actually required at higher frequencies for a wide radiation characteristic. These initially contradictory demands can be simultaneously satisfied by the coupling piece 36.

The coupling piece 34 makes possible a wide radiation characteristic with a perpendicular orientation of the ultrasonic transducers 18*a*-*b*. In principle, it is also conceivable to align the ultrasonic transducers 18*a*-*b* obliquely with respect to one another. The part region 32 is then correspondingly chamfered for this purpose. The production is accordingly more complex because this contour of the flow passage has to be provided and the advantage of a fully smooth flow passage that does not differ at all from the remaining line is at least partially lost.

Figure 3:
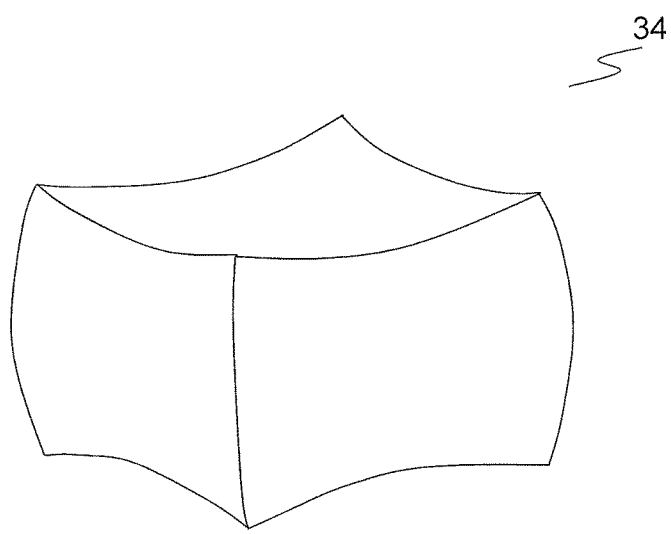
FIG. 3 a schematic three-dimensional representation of the oscillation of an oscillating body of an ultrasonic transducer.

FIG. 3 again separately shows a schematic three-dimensional representation of the oscillating body 34 for explaining its oscillating behavior. The specific parallelepiped-shaped or cube-shaped geometry of the oscillating body 34 and equally the specific deformation of the oscillation are to be understood as exemplary. The oscillating body 34 carries out a special oscillation in operation that is illustratively called a pillow oscillation because it is reminiscent of a strongly shaken pillow due to the only small-surface fixing to the coupling piece 36 and due to its geometrical extent in the vertical direction and lateral direction. This can be understood as a volume resonance. While the oscillating body 34 becomes shorter in the longitudinal working direction, that is in the vertical direction in FIG. 3, it thickens transversely at all sides. This is particularly pronounced at the lateral edges due to the block geometry. The shortening in the longitudinal direction is also not uniform, but is rather very highly pronounced at the center, while the corners move less. This oscillation is transmitted by the coupling piece 36 to the membrane or to the part region 32 or conversely the membrane sets the oscillating body 34 into oscillation via the coupling piece 36 on incident ultrasound.

The oscillating body 34 preferably works in a frequency range of some hundred kHz up to some MHz, with, however, the principle also working from a few kHz to at least ten MHz. The specific useful frequencies are fixed by the geometry and by the material so that it is considered on the configuration of the oscillating body 34. The oscillating body 34 is preferably operated at one of its resonances; the coupling piece 36 at its resonance or beneath its resonance. The resonance of the part region 32 can also selectively be used.

FIG. 4 again shows the pocket 30 with the coupling piece 36 in a three-dimensional sectional view. The pocket 30 is cylindrical in the upper region in this example and tapers inwardly due to a frustoconical shape. The inner contour thereby reduces in the direction of the part region 32 that thus has a smaller surface than the cross-section in the upper region of the pocket 30 that can in particular also be smaller than the oscillating body 34 due to the coupling piece 36. The coupling piece 36 is of cylindrical shape in this embodiment.

FIG. 5 again shows a longitudinal section of the measurement apparatus 10 in the region of an ultrasonic transducer 18*a*, similar to FIG. 2, but with a different geometry of the pocket 30. While the pocket 30 previously tapered conically toward the part region 32, a stepped configuration of the pocket with a larger cylinder diameter in the region of the oscillating body 34 and a small cylinder diameter in the region of the coupling piece 36 is shown in FIG. 5.

Figures 5, 6:
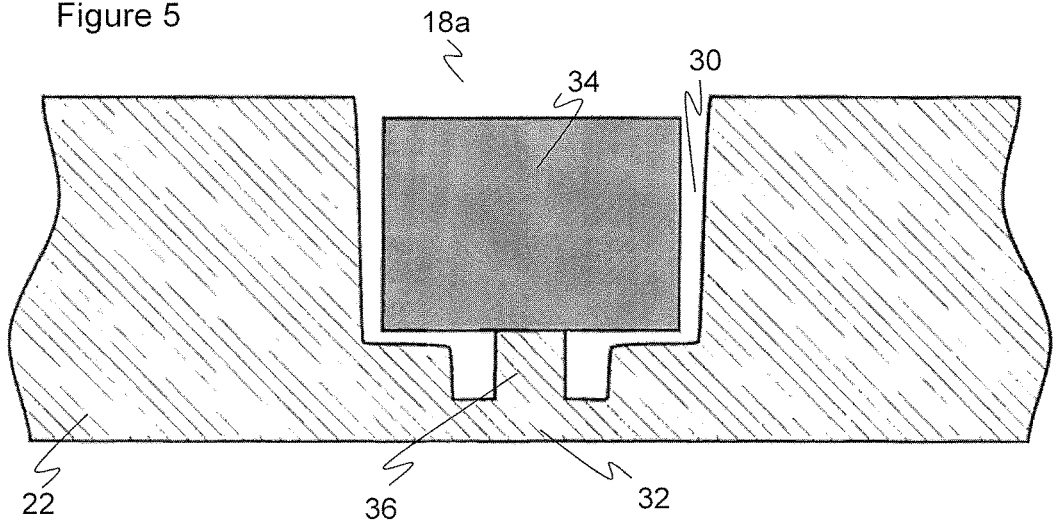
FIG. 5 a detailed view of an ultrasonic transducer similar to FIG. 2 for a geometrical variant of a pocket.
FIG. 6 an overview of possible geometrical embodiments of pockets with a coupling piece for an ultrasonic transducer.
Figure 7:
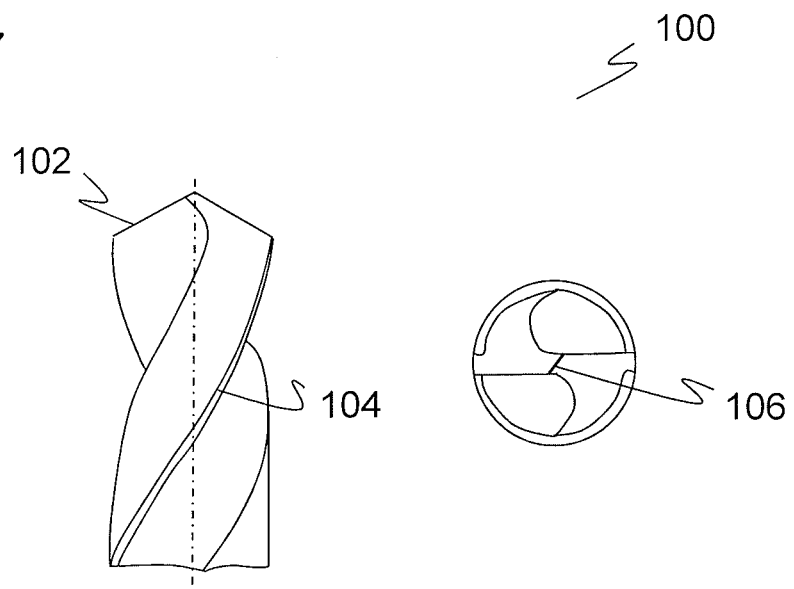
FIG. 7 an illustration of a drilling tool for the introduction of terms for its description.

FIG. 6 shows an overview of possible geometrical designs of the pocket 30 and of the coupling piece 36. A suitable geometry of the pocket 30 generally shows a recess with a simple or double curvature, the coupling piece 36 with different possible diameters and heights, and a suitably designed and dimensioned membrane. As shown vertically, the pocket 30 can be cylindrical, stepped, elliptical or conical here. This relates to the contour in a vertical section through the pocket 30, as shown. The pocket 30 is preferably circular in a cross-section. Deviations are, however, also conceivable here. The corresponding geometry variants are available such as shown horizontally for the coupling piece. In this respect, the overview is additionally divided into two groups in the horizontal direction that differ by the quality of the surface of the base of the pocket 30, that is of the part region 32 acting as the membrane. The membrane can be smooth, as in the left part of FIG. 6, or structured, as in the right part of FIG. 6, with the sketched structure only being a representative example.

The compilation of FIG. 6 is not exclusive. For example, more than two steps can be provided, the shape can be changed from step to step, as also in FIG. 5 from cylinder to cone, or other continuous, non-linear shapes than an elliptical contour can be selected. However, the condition of a cross-section surface noticeably smaller in comparison with the oscillating body 34 preferably remains for the coupling piece 36. The shape of a cube, of a parallelepiped or of a cylinder can be considered for the oscillating body 34 not shown in FIG. 6, for example.

The manufacture of the pocket 30 with the coupling piece 36 comprises a drilling process in accordance with the invention. This manufacture will now be explained with reference to different embodiments. For this purpose, FIG. 7 first shows by way of introduction a side view in the left part and a plan view of the drilling tool 100 in the right part. The main cutting edges 102 that ensure the front-face cutting stroke in the direction of advance are located at the tip. The lateral secondary cutting edges 104 face the workpiece and determine the diameter of the borehole. The transverse cutting edge 106 connects the two main cutting edges 102 in the region of the drill core. It makes the cutting procedure more difficult since it only squeezes the material and does not cut it.

In this form, a drilling tool 100 is not suitable for the manufacture of the pocket 30 with coupling piece 36. The structures generated with a conventional tool are too large; typical structure sizes in profile drilling are 3 mm. In addition, the drilling tool 100 lacks a design that would be suitable for the manufacture of the central coupling piece 36.

For the demands on a production technology for manufacturing the geometry of the pocket 30 are very high with respect to the precision, the machining time and the process efficiency. On the one hand, the dimensions are in the field of micro-machining in which such geometry structures are primarily manufactured via the production process of micro cutting. On the other hand, the possible geometries over which FIG. 6 gives an overview comprise a plurality of functional elements whose functionality is greatly dependent on the achievable differences of dimension, shape and position of the production process.

Due to the complexity of the geometry, only a part thereof can be generated via the main cutting edge profile of the profile drill in accordance with the main cutting edges 102. Further cutting edge elements that are not conventionally provided are required at the tool to generate the complete geometry.

Figure 4:
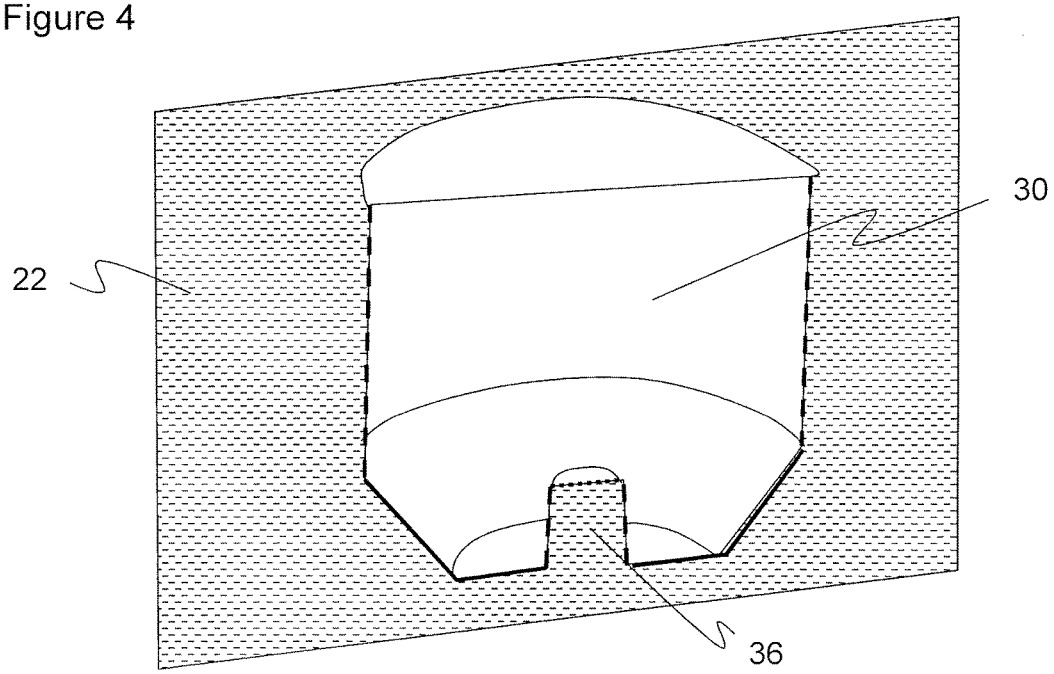
FIG. 4 a three-dimensional inner view of a pocket in the pipe wall for an ultrasonic transducer.

These modifications can be explained in a look back to the exemplary geometry in accordance with FIG. 4. The elements of the recess and of the adjoining cone and a part of the base of the pocket 30 can be mapped over the main cutting edge profile. These regions are emphasized by a bold line. All the further elements have to be implemented by further cutting edges and modified cutting edges.

In this respect, the recess of the pocket 30 itself manufactured via the main cutting edge profile and the conical shape only have secondary significance for the functionality. The membrane or the part region 32 and coupling piece 36 are rather relevant to the functionality. The membrane is also manufactured via the main cutting edge profile, and indeed over the part that extends radially at an angle of 90° to the drill axis. The functionality of the membrane of the pocket base is dependent on the planarity implemented by the tool or on a specifically applied structure. The thickness of the membrane is determined technologically by the drilling depth. With a very small membrane thickness, a counter-holder may be sensible that is positioned at the inner wall of the pipe.

The secondary cutting edges of the drilling tool are responsible for the side walls of the pocket 30 and of the coupling piece 36, as shown in FIG. 4 by a bold dashed line. The outer secondary cutting edges still correspond to the conventional tool design. They correspond to the side walls of the pocket 30 and are less relevant to the function of the pocket 30 or of the measurement apparatus 10. In contrast, inwardly disposed secondary cutting edges for the sides of the coupling piece 36 connected to the base in the part region 30 are typically not provided. In this respect, small diameter differences and a high reproducibility can be achieved. The length of the coupling piece 36 is implemented by an additional inwardly disposed transverse cutting edge that also defines the planarity on the connection surface of the coupling piece 36. The effect of this special transverse cutting edge is indicated by a bold dotted line in FIG. 4. The geometry of the coupling pieces 36 that contributes to a substantial improvement of the measurement apparatus 10 is thus achieved by a modification of the drilling tool. Pockets with geometries in the order of magnitude of 3 mm can be manufactured in a secure process by an expansion of the technology in comparison with the known profile bores. As a numerical example for the structure sizes to be manufactured, the diameter of the coupling piece 36 and its height amount at most to 2 mm and the thickness of the membrane to at most 0.8 mm.

Profile drilling, in particular with a modified drilling tool such as just described, is a possible embodiment of the manufacture of the pocket 30. (Indirect) extrusion can also be considered for a manufacture of refining of the geometry in addition to (blind hole) profile drilling, with the former then preferably being preceded by a drilling. The geometry of the pocket 30 is consequently created in accordance with the invention by a single-stage or multi-stage production process comprising pre-drilling, profile drilling and/or extrusion.

Figure 8:
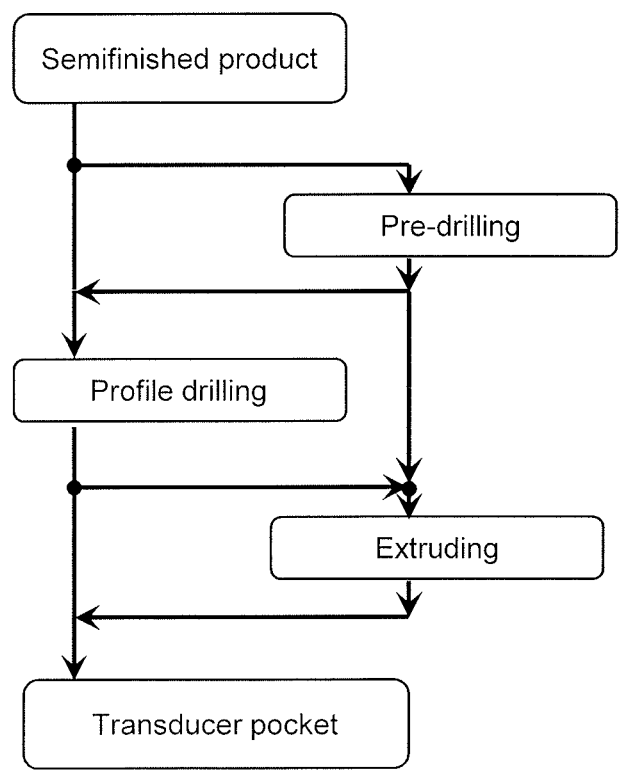
FIG. 8 a diagram for production variants for manufacturing a pocket with a coupling piece.

FIG. 8 shows specific advantageous process chains. The five process chains that can be derived from FIG. 8 will now be explained in more detail with reference to FIGS. 9 to 13.

Figure 9:
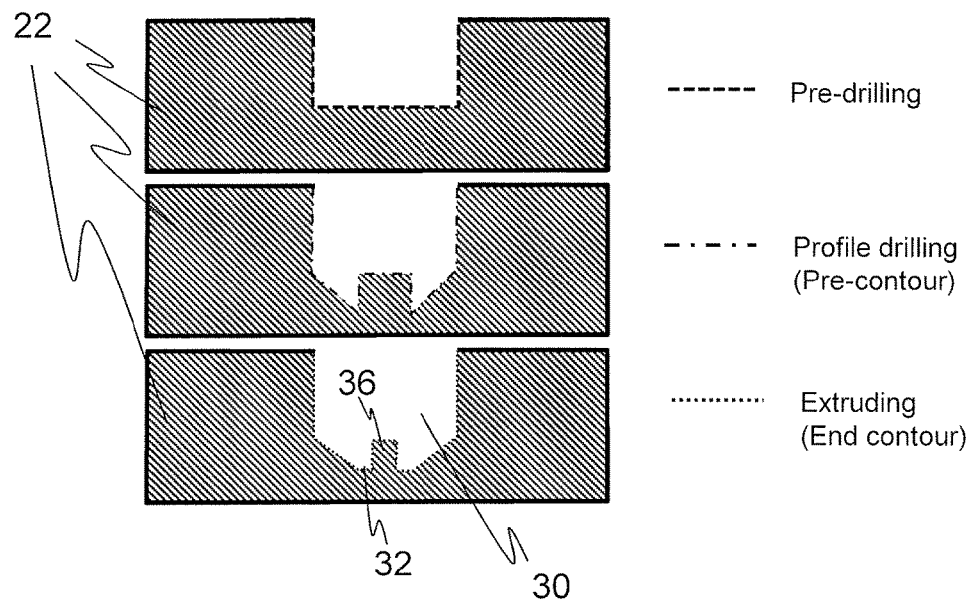
FIG. 9 an illustration of the manufacture of a pocket by a process chain of pre-drilling—profile drilling—extrusion.

FIG. 9 shows the procedure for the process chain pre-drilling—profile drilling—extrusion. In this embodiment, the wall thickness in the region of the pocket 30 is first reduced by a pre-drilling process step. Subsequently, a pre-profile shape is generated by profile drilling with an allowance. The end shaping takes place in the last step by an extrusion process in which the profile allowance of the pocket 30 is reshaped into the corresponding end shape by a profile die.

Figure 10:
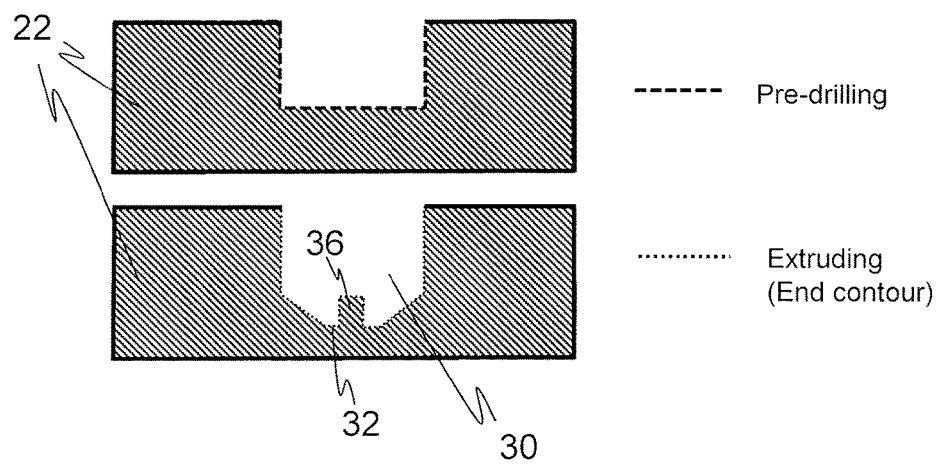
FIG. 10 an illustration of the manufacture of a pocket by a process chain of pre-drilling—extrusion.

FIG. 10 shows the procedure for the process chain pre-drilling—extrusion. In this embodiment, the wall thickness in the region of the pocket 30 is again reduced in a defined manner by a pre-drilling process step. Sufficient material is available for the subsequent extrusion to mold the geometry elements of the pocket 30. The profile drilling is omitted in this process.

Figure 11:
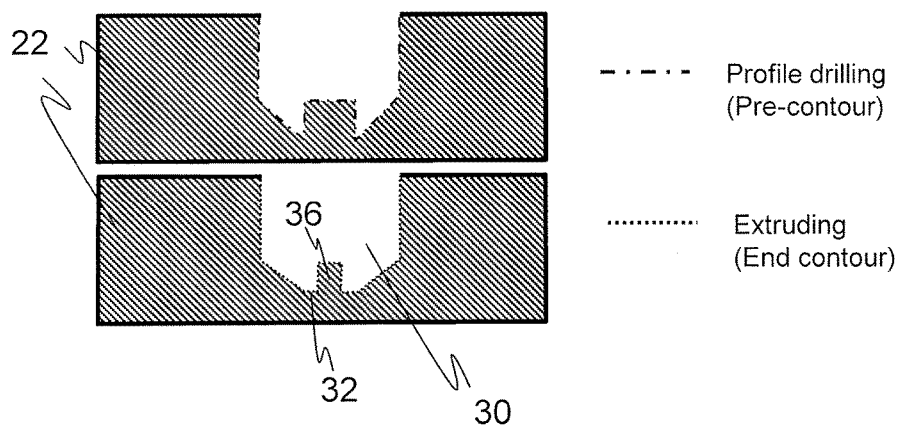
FIG. 11 an illustration of the manufacture of a pocket by a process chain of profile drilling—extrusion.

FIG. 11 shows the procedure for the process chain profile drilling—extrusion. In this embodiment a pre-shape of the pocket 30 up to a defined wall thickness is generated by means of profile drilling via the profiled drilling tool. The end shaping then takes place in the second and final step by an extrusion process in which the pocket allowance profile is pressed into the corresponding end shape by a profile die. The pre-drilling is omitted here.

Figure 12:
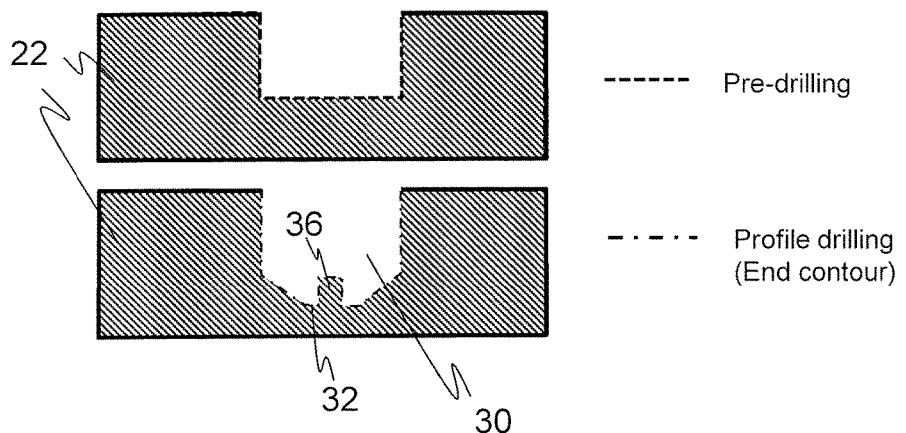
FIG. 12 an illustration of the manufacture of a pocket by a process chain of pre-drilling—profile drilling.

FIG. 12 shows the procedure for the process chain pre-drilling—profile drilling. The process chain of this embodiment provides that the wall thickness is reduced by a pre-drilling step in the region of the pocket geometry. The pocket end shape is subsequently generated via a profiled drilling tool. A final extrusion is omitted; the profile drilling directly generates the end contour.

Figure 13:
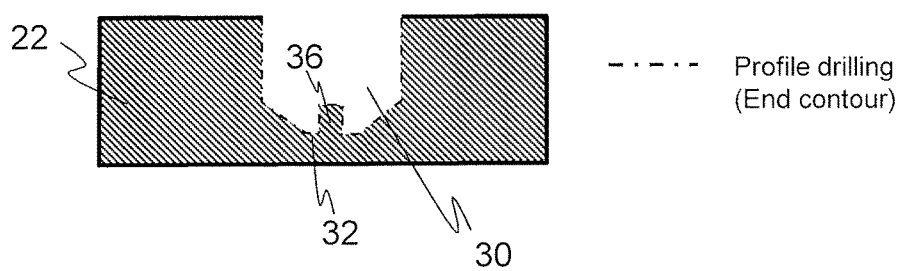
FIG. 13 an illustration of the manufacture of a pocket by profile drilling alone.

FIG. 13 shows the procedure for a single-step production process in which the end shape of the pocket 30 is generated directly over the complete wall thickness via the profiled drilling tool. Both the pre-drilling and the extrusion are omitted here.

As follows from the embodiments, a pre-drilling process is not absolutely necessary to generate the geometry of the pocket, but can inter alia achieve a reduction of the tool wear. The end shape can equally be achieved via profile drilling or it can be achieved via extrusion. The advantages of both processes can be combined, which results in a particularly precise production, but also in a somewhat more complex production.

The specific choice of the process chain is inter alia influenced by the desired geometry of the pocket 30, by the material being machined, and by the batch sizes to be manufactured. A shape drill specifically configured for the geometry of the pocket and/or an extrusion die are required in dependence on the embodiment. The manufacturing process is also revealed in another respect by method-characteristic machining traces.

The invention claimed is:

1. A method of manufacturing an ultrasound flow rate measurement apparatus, the method comprising the steps of:
    manufacturing at least one pocket for an ultrasonic transducer from the outside in a line wall of a line section in which a fluid flows in operation;
    arranging an ultrasonic transducer in the pocket, wherein the ultrasonic transducer has an oscillating body that couples to a part region of the line wall and that acts as a membrane of the ultrasonic transducer capable of vibration, wherein a manufacturing step of the pocket has a drilling procedure; and
    manufacturing a coupling piece with the pocket and arranging the coupling piece between the membrane and the oscillating body after the insertion of the ultrasonic transducer, wherein a cross-section of the coupling piece is smaller than a cross-section of the oscillating body.

2. The method in accordance with claim 1, wherein the drilling procedure comprises profile drilling.

3. The method in accordance with claim 2, wherein a profile drilling tool is used that has an inwardly disposed secondary cutting edge with which lateral surfaces of the coupling piece are manufactured.

4. The method in accordance with claim 2, wherein a profile drilling tool is used that has an inwardly disposed transverse cutting edge with which the height and contact surface of the coupling piece is manufactured.

5. The method in accordance with claim 1, wherein the drilling procedure comprises pre-drilling.

6. The method in accordance with claim 1, wherein an extrusion procedure takes place after the drilling procedure to manufacture an end shape of the geometry of the pocket.

7. The method in accordance with claim 1, wherein the coupling piece is configured in one piece with the line wall.

8. The method in accordance with claim 1, wherein a base of the pocket forms the membrane and is arranged on a base of the coupling piece.

9. The method in accordance with claim 1, wherein the coupling piece has a diameter and/or a height of a few millimeters.

10. The method in accordance with claim 9, wherein the diameter and/or the height is at most 2 mm.

11. The method in accordance with claim 1, wherein the line wall has a residual wall thickness of at most one 1 mm in the region of the membrane.

12. The method in accordance with claim 1, wherein the coupling piece has a cylindrical, conical or stepped geometry.

13. The method in accordance with claim 1, wherein the line wall surrounding the coupling piece is planar or structured.

14. The method in accordance with claim 1, wherein the pocket has a cylindrical, conical, elliptical or stepped geometry overall.

15. The method in accordance with claim 1, wherein the pocket is closed toward the outside by a transducer holder.

16. The method in accordance with claim 15, wherein the oscillating body is elastically connected to the transducer holder.

17. The method in accordance with claim 1, wherein the oscillating body can vibrate in the longitudinal and transverse directions.

18. An ultrasound flow rate measurement apparatus for determining the flow speed of a fluid flowing in a line using at least one ultrasonic transducer that is attached from the outside in a pocket of a line wall of the line and that has an oscillating body that couples to a part region of the line wall and that acts as a membrane of the ultrasonic transducer capable of vibration, wherein a coupling piece whose cross-section is smaller than the cross-section of the oscillating body is arranged between the membrane and the oscillating body; wherein the pocket is manufactured by a manufacturing step that comprises a drilling procedure; and wherein the coupling piece is manufactured with the pocket.

19. The ultrasound measurement apparatus in accordance with claim 18, that is manufactured by a method of manufacturing an ultrasound flow rate measurement apparatus, the method comprising the steps of:
    manufacturing at least one pocket for an ultrasonic transducer from the outside in a line wall of a line section in which a fluid flows in operation;
    arranging an ultrasonic transducer in the pocket, wherein the ultrasonic transducer has an oscillating body that couples to a part region of the line wall and that acts as a membrane of the ultrasonic transducer capable of vibration; and
    manufacturing a coupling piece with the pocket and arranging the coupling piece between the membrane and the oscillating body after the insertion of the ultrasonic transducer, wherein a cross-section of the coupling piece is smaller than a cross-section of the oscillating body.

20. The ultrasound measurement apparatus in accordance with claim 18, that has at least two pockets each having an ultrasonic transducer that are disposed opposite one another with the flow therebetween and with an offset in the direction of flow and that has an evaluation unit that is configured to exchange ultrasound signals between the ultrasonic transducers and to determine the flow speed with respect to a time of flight difference of ultrasound transmitted and received again with and against the flow.

* * * * *